(12) United States Patent  (10) Patent No.: US 8,913,259 B2
Taira et al.  (45) Date of Patent: Dec. 16, 2014

(54) COMPUTER-READABLE RECORDING MEDIUM STORING PRINTER DRIVER FOR CAUSING COMPUTER TO CONVERT TEXT OR VECTOR OBJECT INTO RASTER OBJECT, AND PRINTING METHOD WITH THE PRINTER DRIVER

(75) Inventors: Yoshiyuki Taira, Osaka (JP); Shunta Isami, Osaka (JP)

(73) Assignee: KYOCERA Document Solutions Inc. (JP)

( * ) Notice: Subject to any disclaimer, the term of this patent is extended or adjusted under 35 U.S.C. 154(b) by 252 days.

(21) Appl. No.: 13/558,202

(22) Filed: Jul. 25, 2012

(65) Prior Publication Data

US 2013/0027730 A1   Jan. 31, 2013

(30) Foreign Application Priority Data

Jul. 26, 2011 (JP) .................................. 2011-162911

(51) Int. Cl.
*G06F 3/12*  (2006.01)
(52) U.S. Cl.
CPC .............. *G06F 3/1211* (2013.01); *G06F 3/122* (2013.01); *G06F 3/1245* (2013.01); *G06F 3/1285* (2013.01)
USPC ........................... 358/1.13; 358/1.1; 358/1.15

(58) Field of Classification Search
None
See application file for complete search history.

(56) References Cited

U.S. PATENT DOCUMENTS

| 7,065,259 | B2 * | 6/2006 | Kunimasa et al. | 382/281 |
| 7,692,813 | B2 * | 4/2010 | Ohta et al. | 358/1.18 |
| 8,233,164 | B2 * | 7/2012 | Matsuda | 358/1.13 |
| 2006/0152750 | A1 * | 7/2006 | Ohta et al. | 358/1.13 |
| 2009/0237719 | A1 * | 9/2009 | Miura | 358/1.15 |
| 2011/0317185 | A1 * | 12/2011 | Furuya | 358/1.9 |

FOREIGN PATENT DOCUMENTS

| JP | 2001-043052 | 2/2001 |
| JP | 2011-043915 | 3/2011 |

* cited by examiner

*Primary Examiner* — Marcus T Riley
(74) *Attorney, Agent, or Firm* — McDonnell Boehnen Hulbert & Berghoff LLP

(57) ABSTRACT

A computer-readable recording medium stores a printer driver that causes a computer to function as: a PDL conversion unit configured to convert drawing data received from an application into PDL data; a rasterization unit configured to convert at least one of a text object and a vector object into a raster object when the drawing data is converted into the PDL data; and a communication control unit configured to transmit the PDL data to an image forming apparatus. Before-conversion information, that indicates a data format of the object before the conversion is associated with the converted raster object.

14 Claims, 8 Drawing Sheets

☐ USE ALTERNATIVE FONT

☐ RASTERIZE TEXT

☐ RASTERIZE LINE OR SHAPE

[RETURN] [NEXT]

FIG. 3A

RASTERIZE WITH PRITER DRIVER

☐ REDUCE GRAY LEVEL
OF TEXT
☐ REDUCE GRAY LEVEL
OF LINE OR SHAPE

[RETURN]

FIG. 3B

RASTERIZE WITH PRITER DRIVER

☐ CONVERT TEXT INTO
MONOCHROME
☐ CONVERT LINE OR SHAPE INTO
MONOCHROME

[RETURN]

FIG. 3C

COMPUTER-READABLE RECORDING MEDIUM STORING PRINTER DRIVER FOR CAUSING COMPUTER TO CONVERT TEXT OR VECTOR OBJECT INTO RASTER OBJECT, AND PRINTING METHOD WITH THE PRINTER DRIVER

INCORPORATION BY REFERENCE

This application is based upon, and claims the benefit of priority from, corresponding Japanese Patent Application No. 2011-162911, filed in the Japan Patent Office on Jul. 26, 2011, the entire contents of which are incorporated herein by reference.

BACKGROUND

1. Field

The present disclosure generally relates to a computer-readable recording medium storing a printer driver for converting drawing data received from an application into page description language (PDL) data and transmitting the PDL data to an image forming apparatus, and a printing method with the printer driver. The present disclosure particularly relates to the computer-readable recording medium storing the printer driver for converting a text object or a vector object into a raster object in accordance with specified settings when the drawing data is converted into the PDL data and the printing method with the printer driver.

2. Description of the Related Art

The printer driver causes a computer to convert the drawing data received from the application into the PDL data and to transmit the PDL data to the image forming apparatus. When drawing data is converted into the PDL data, text objects (character codes), vector objects (shapes or lines), and raster objects are basically converted into objects of the same format.

As an exception, for example, if a font specified by a user is not stored in the image forming apparatus, text font data may be converted into raster font data without using alternative font data stored in the image forming apparatus, and a document may be printed.

Further, for example, if the print processing speed is low or if many print jobs are waiting to be processed, the print processing speed of the entire system may be increased by distributing the printing process. In such a case, the text object or the vector object may be converted into the raster object by the printer driver.

Meanwhile, when a text object or a vector object is converted into a raster object by the printer driver, the total number of pixels of cyan, magenta, yellow, and black (CMYK) is calculated, and a logical color material usage of the CMYK is calculated.

In color printing, however, when the color of a raster object is black or close to black, since drawing is performed by overlaying three colors (that is, the CMY) among of the CMYK, the memory usage is increased, which may cause an error due to a memory shortage, may reduce printing speed, and may reduce saturation.

SUMMARY

The present disclosure relates to a computer-readable recording medium storing a printer driver, and a printing method with the printer driver, that converts a text object or a vector object into a raster object and that, when color printing is performed, and the color of the raster object is black or close to black, prevents (i) errors due to memory shortages, (ii) reduced printing speeds, and (iii) reduced saturation.

According to an aspect of the present disclosure, there is provided a computer-readable recording medium storing a printer driver, the printer driver causing a computer to function as: a PDL conversion unit configured to convert drawing data received from an application into PDL data; a rasterization unit configured to convert at least one of a text object and a vector object into a raster object when the drawing data is converted into the PDL data; and a communication control unit configured to transmit the PDL data to an image forming apparatus, wherein before-conversion information, that indicates a data format of the object before the conversion, is associated with the converted raster object.

According to another aspect of the present disclosure, there is provided a computer-readable recording medium storing a printer driver, the printer driver causing a computer to function as: a PDL conversion unit configured to convert drawing data received from an application into PDL data; a rasterization unit configured to convert at least one of a text object and a vector object into a raster object when the drawing data is converted into the PDL data; and a communication control unit configured to transmit the PDL data to an image forming apparatus, wherein before-and-after-conversion information, that indicates data formats of the object before and after the conversion, is associated with the raster object.

According to yet another aspect of the present disclosure, there is provided a printing method with the printer driver, the method including: converting drawing data received from an application into PDL data; converting at least one of a text object and a vector object into a raster object when the drawing data is converted into the PDL data; associating before-conversion information that indicates a data format of the object before the conversion with the converted raster object; and transmitting the PDL data to the information forming apparatus.

BRIEF DESCRIPTION OF FIGURES

In the accompanying drawings:

FIG. 3A is a schematic diagram illustrating an example of a rasterization setting screen according to the first embodiment;

FIG. 3B is a schematic diagram illustrating an example of a gray level reduction setting screen according to the first embodiment;

FIG. 3C is a schematic diagram illustrating an example of a monochrome conversion setting screen according to the first embodiment;

DETAILED DESCRIPTION

1. First Embodiment

Figure 1:
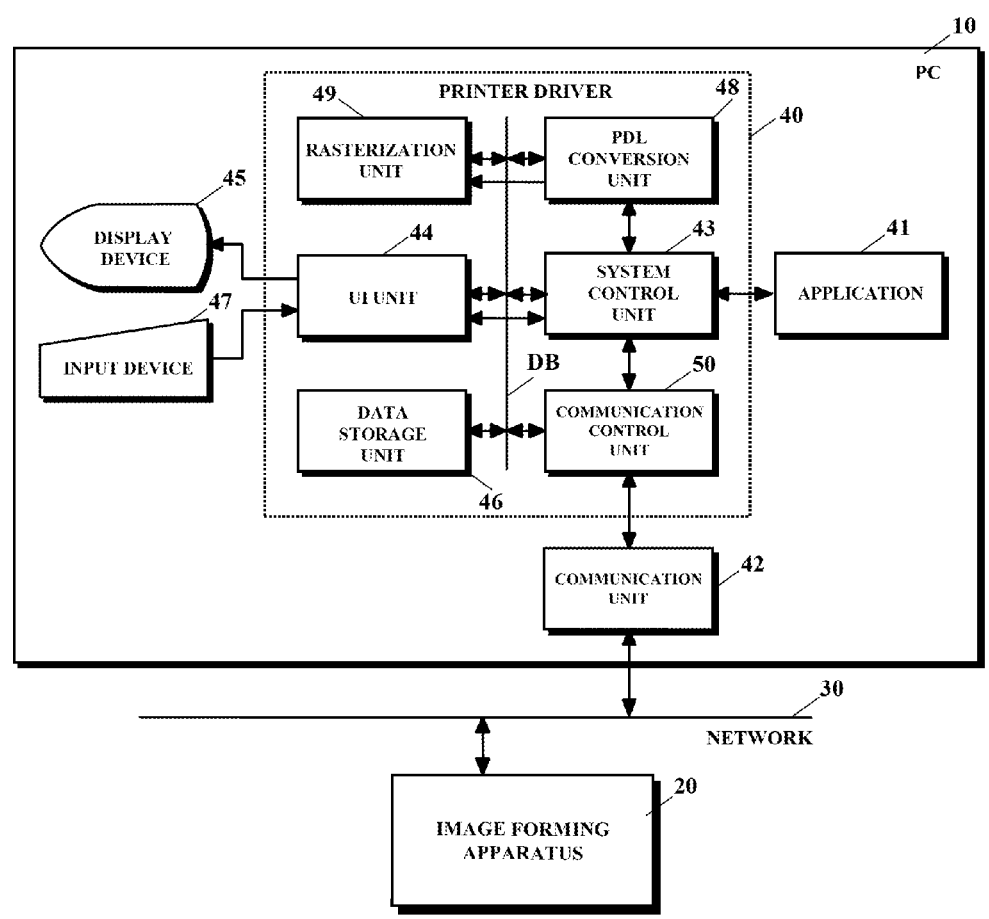
FIG. 1 is a block diagram illustrating a configuration of an image forming system according to a first embodiment.

FIG. 1 is a block diagram illustrating the configuration of an image forming system according to a first embodiment.

A personal computer (PC) 10 is configured to execute a printer driver 40 stored in a recording medium according to an aspect of the present disclosure, and is connected to an image forming apparatus 20 via a network 30. The image forming apparatus 20 has at least one of a printing function, an image reading function, and a facsimile transmitting/receiving function.

The PC 10 has the same or similar hardware configuration as a typical computer system. For example, the PC 10 includes a communication unit 42, an input device 47, and a display device 45.

The communication unit 42 is configured to perform data communication with peripherals such as the image forming apparatus 20. The communication unit 42 may include a peripheral interface and a network interface card (NIC).

The input device 47 is configured to detect a user operation, and to output the detected user operation as an electric signal. The input device 47 may include a keyboard, a mouse, and a touch panel.

The display device 45 is configured to receive the electric signal, and to display an image corresponding to the electric signal on a screen. The display device 45 may include a liquid crystal display.

The printer driver 40 is stored in a recording medium. Examples of the recording medium may include a Read Only Memory (ROM), a universal serial bus (USB) memory, a flexible disk, a memory card, and a magneto-optical disk. These devices are read by the PC 10. When the printer driver 40 is executed on the PC 10, a PDL conversion unit 48, a rasterization unit 49, a system control unit 43, a user interface (UI) unit 44, a communication control unit 50, and a data storage unit 46 are implemented, for example.

The system control unit 43 controls the PDL conversion unit 48 so as to convert drawing data (e.g., GDI data) supplied from an application 41 via a library of the operating system (OS), into PDL data that is readable by the image forming apparatus 20. The communication control unit 50 controls the communication unit 42 so as to transmit the PDL data to the image forming apparatus 20.

When the printer driver 40 is started by the application 41, the system control unit 43 controls the UI unit 44 so as to cause the display device 45 to display a print condition setting screen.

Figure 2:
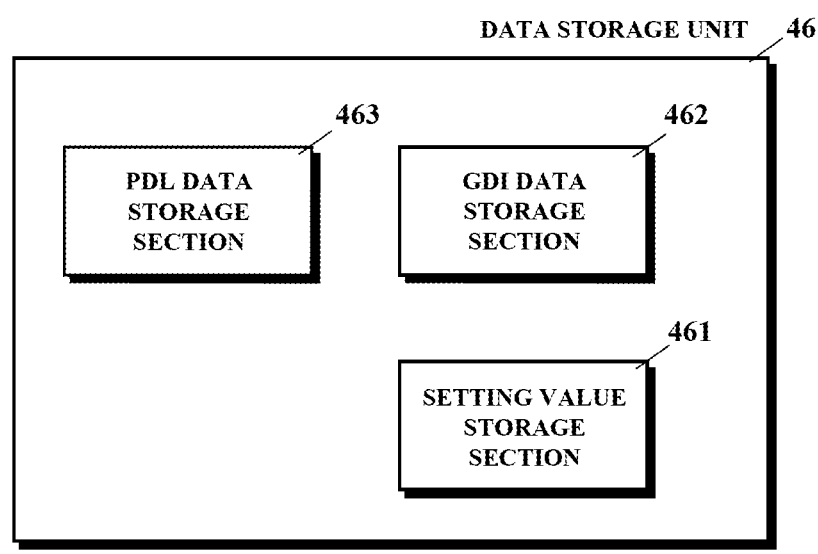
FIG. 2 is a block diagram illustrating a configuration of a data area of a data storage unit according to the first embodiment.

FIG. 2 is a block diagram illustrating the configuration of a data area of the data storage unit 46. The data storage unit 46 includes a setting value storage section 461, a GDI data storage section 462, and a PDL data storage section 463.

The setting value storage section 461 stores default values, and/or setting values that may be updated through the input device 47 and include print conditions such as the sheet size, the number of pages per sheet (the number of pages to be combined), the number of sets to be printed, the printing area, the printer properties, and the like. The setting value storage section 461 includes a non-volatile storage such as a flash memory. The GDI data storage section 462 and the PDL data storage section 463 store the GDI data and the PDL data, respectively.

FIGS. 3A, 3B, and 3C are schematic diagrams illustrating examples of a rasterization setting screen, a gray level reduction setting screen, and a monochrome conversion setting screen that are displayed via the UI unit 44.

FIG. 3A is a schematic diagram illustrating a rasterization setting screen as one of the above-described print condition setting screens. This setting screen includes three options. The first option is to select, if a font specified by the user is not present in the image forming apparatus 20, whether to use an alternative font stored in the image forming apparatus 20 similar to the specified font, i.e., whether to rasterize the text object in accordance with a font file stored in the PC 10 by the printer driver 40 without using an alternative font. The second and third options are to select whether to convert the text object into the raster object and to select whether to convert the vector object into the raster object, respectively, which may be preferable when many jobs are waiting to be processed, for example.

If one or more of the options are selected and a "Next" button is pressed on the screen of FIG. 3A, a gray level reduction setting screen illustrated in FIG. 3B may be displayed as another print condition setting screen, for example. If the text object or the vector object have been converted into the raster object by the printer driver 40 in accordance with the setting value selected on the screen of FIG. 3A, then the gray level reduction setting screen includes the options to select whether to reduce the number of gray levels of the raster object in the image forming apparatus 20.

Further, if one or more of the options are selected and the "Next" button is pressed on the screen of FIG. 3A, a monochrome conversion setting screen illustrated in FIG. 3C may be displayed as yet another print condition setting screen, for example. If the text object or the vector object has been converted into the raster object by the printer driver 40 in accordance with the setting value set on the screen of FIG. 3A, then the monochrome conversion setting screen includes the options to select whether to convert the raster object into monochrome in the image forming apparatus 20.

Referring back to FIG. 1, the display device 45 displays the setting values that are specified by selecting the options on the print condition setting screen, and are stored in the setting value storage section 461. Each time the options are selected through the input device 47, the setting values in the setting value storage section 461 are set or updated via the UI unit 44. The data stored in the data storage unit 46 is provided through a data bus (DB) to each of the units of the printer driver 40.

After the options are selected on the print condition setting screen, an "OK" button (not illustrated) on the print condition setting screen is pressed by the user through the input device 47. This pressing operation is detected and a result of the detection is transmitted to the system control unit 43 via the UI unit 44. In response to this transmission, the system control unit 43 calls the PDL conversion unit 48. The PDL conversion unit 48 converts the object in the GDI data storage section 462 into the PDL data without changing a data format of the text object, the vector object, or the raster object, and stores the PDL data into the PDL data storage section 463.

The PDL conversion unit 48 calls the rasterization unit 49 at each time that the object in the GDI data storage section 462 is converted. Then, the rasterization unit 49 performs an operation illustrated in FIG. 4. It should be noted that the symbols illustrated in parentheses in the following description correspond to the step identification symbols illustrated in the flowcharts.

Figure 4:
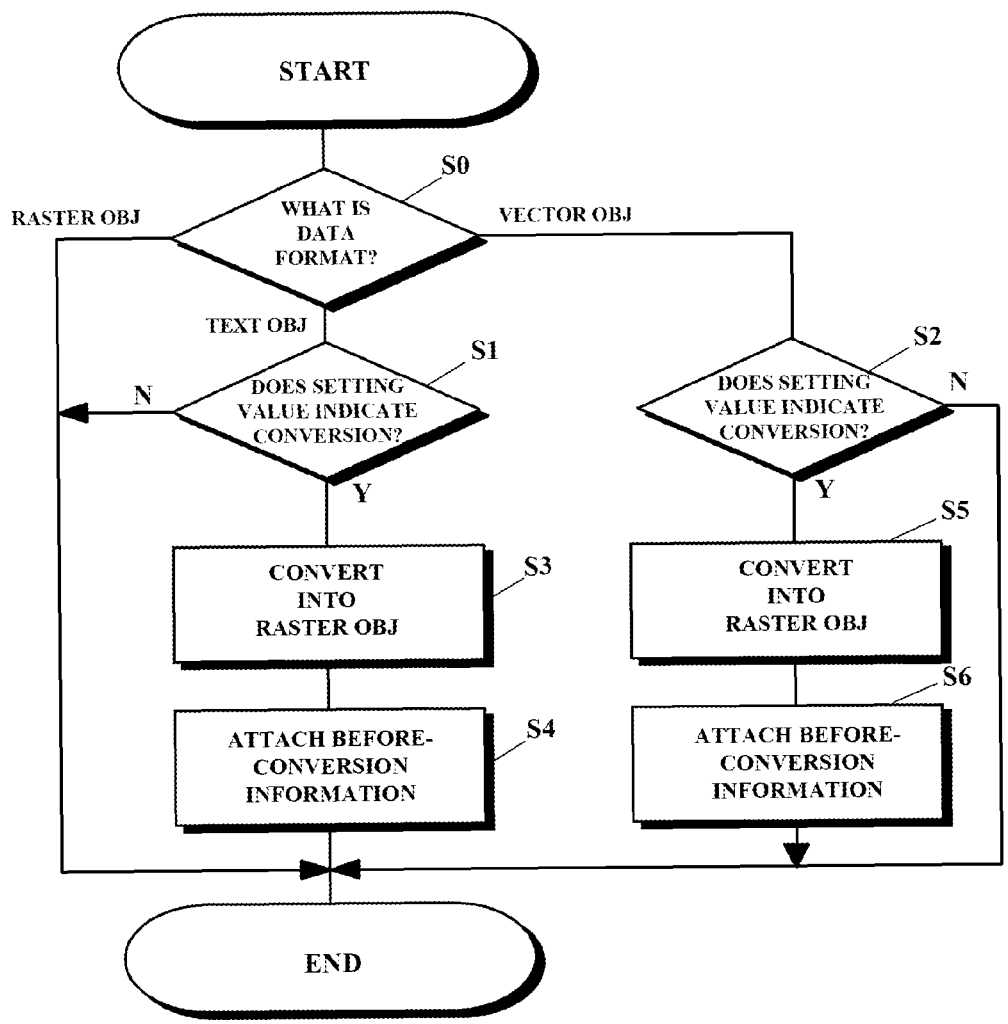
FIG. 4 is a flowchart illustrating an operation performed on an object by a rasterization unit according to the first embodiment.

FIG. 4 is a flowchart illustrating the operation performed on the object by the rasterization unit 49.

(S0) If the object is a raster object, the operation of FIG. 4 ends. If the object is a text object, the process proceeds to Step S1. If the object is a vector object, the process proceeds to Step S2.

(S1) If the setting value in the setting value storage section 461 indicates a conversion of the text object into a raster object, the process proceeds to Step S3. If not, the operation of FIG. 4 ends.

(S2) If the setting value in the setting value storage section 461 indicates a conversion of the vector object into a raster object, the process proceeds to Step S5. If not, the operation of FIG. 4 ends.

(S3) In Step S1, the text object is converted into a raster object if the setting value indicates that such a conversion is to be made. For example, the character code is converted into vector font data by referring to glyph data of the specified font. Then, the vector font data is expanded into a bitmap so as to be converted into raster font data.

(S4) Before-conversion information indicating that the object was a text object before the conversion is associated with the raster object, and thus the operation of FIG. 4 ends.

(S5) In the Step S2, the vector object is converted into a raster object if the setting value indicates that such a conversion is to be made. For example, the vector font data is expanded into a bitmap so as to be converted into raster font data.

(S6) The before-conversion information indicating that the object was a vector object before the conversion is associated with the raster object, and thus the operation of FIG. 4 ends.

Referring back to FIG. 1, when the operations on all the objects in the GDI data storage section 462 by the PDL conversion unit 48 and the rasterization unit 49 are completed, the system control unit 43 causes the communication control unit 50 to transmit the PDL data stored in the PDL data storage section 463 to the image forming apparatus 20 via the communication unit 42.

Figure 5A:
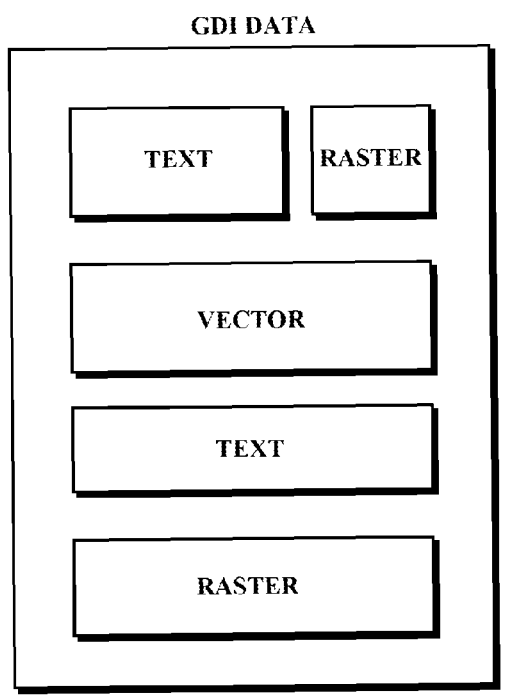
FIG. 5A is a schematic diagram illustrating a configuration of graphic device interface (GDI) data of one page according to the first embodiment.
Figure 5B:
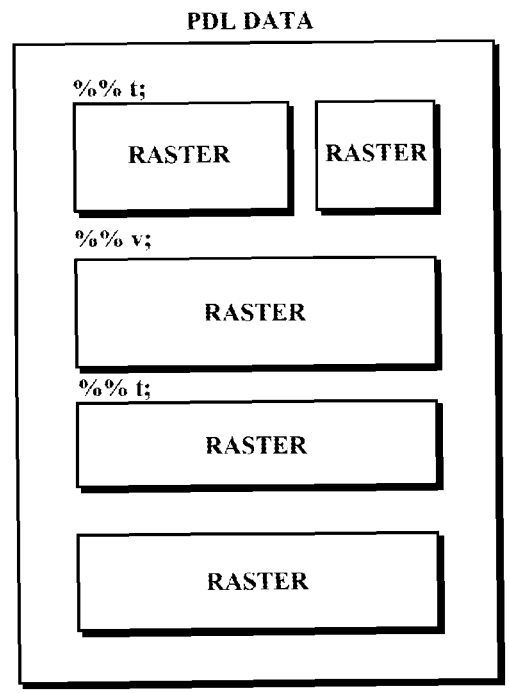
FIG. 5B is a schematic diagram illustrating a configuration of PDL data corresponding to the GDI data of one page illustrated in FIG. 5A according to the first embodiment.

FIG. 5A is a schematic diagram illustrating the configuration of GDI data of one page, and FIG. 5B is a schematic diagram illustrating the configuration of the PDL data corresponding to the GDI data of the one page illustrated in FIG. 5A. In reality, the objects are scattered in the file and have a reference relationship with each other so as to be hierarchically arranged, and the arrangement coordinates are contained in the objects. In FIGS. 5A and 5B, the objects are schematically arranged to fit on the sheet. The object labeled "TEXT", the object labeled "VECTOR", and the object labeled "RASTER" represent the text object, the vector object, and the raster object, respectively.

When the setting values are set on the screens illustrated in FIGS. 3A and 3B, the operations in Steps S4 and S6 of FIG. 4 are performed. That is, the before-conversion information is attached to the object whose data format has been converted in the PDL data. The before-conversion information may be attached as a comment ("%% t" and "%% v" illustrated in FIG. 5B) to the object, for example.

By implementing the before-conversion as a comment, an error in an image forming apparatus 20 that does not support operations controlled in accordance with before-conversion information is prevented, such error occurring because the apparatus would be unable to read the before-conversion information and unable to perform operations in accordance with the before-conversion information. It should be noted that the before-conversion information may be attached to the front or rear of the object.

The letter "t" following "%%" (with/without a space therebetween) indicates that the object was a text object before the conversion into the raster object. Similarly, the letter "v" indicates that the object was a vector object before the conversion into the raster object.

Figure 6A:
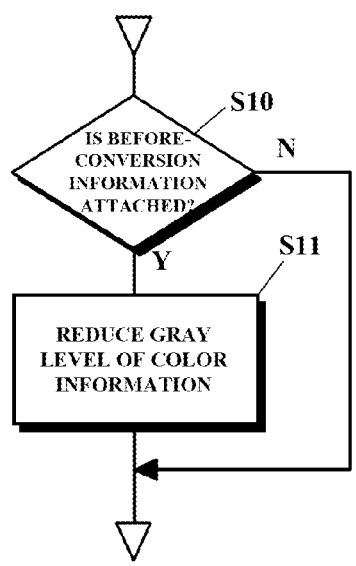
FIG. 6A is a flowchart illustrating an example of an operation in accordance with before-conversion information according to the first embodiment.

FIG. 6A is a flowchart illustrating an example of an operation in accordance with the before-conversion information.

(S10) When an interpreter performs an operation of converting PDL data into a display list (converting into an intermediate language), the process proceeds to Step S11 if a comment "%% t" or a comment "%% v" as the before-conversion information is attached to the object. If the before-conversion information is not attached to the object, the process proceeds to a typical conversion into the display list.

(S11) The number of gray levels of color information included in the object is reduced. For example, if the color information included in the object may be 8 bits for each of RGB, then RGB with 8 bits per color may be converted into the CMYK with 8 bits per color by a typical technique. Lower-order bits of the gray level value of each of the CMYK may then be deleted such that the higher-order 2 bits are retained. As a result, the number of gray levels of the color information is reduced.

Figure 6B:
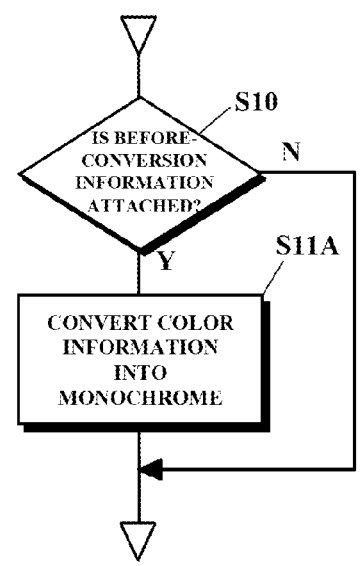
FIG. 6B is a flowchart illustrating another example of an operation in accordance with the before-conversion information according to the first embodiment.

FIG. 6B is a flowchart illustrating another example of an operation in accordance with the before-conversion information.

In place of Step S11 in FIG. 6A, the color information included in the object is converted into monochrome (S11A). For example, if the color information included in the object may be 8 bits for each of RGB, then RGB with 8 bits per color may be converted into the CMYK with 8 bits per color by the typical technique. Then, the conversion into the monochrome may be performed with the color that has a maximum value among the gray level values of the CMYK. As a result, the color information is converted into the monochrome.

According to the first embodiment, when converting the text object or the vector object into the raster object, the before-conversion information is associated with the object. The number of gray levels of the color information may be reduced or the color information converted into the monochrome by the before-conversion information. As a result, it becomes possible to (i) reduce the memory usage so as to prevent an error due to a memory shortage, (ii) increase of the printing speed, and (iii) improve the saturation.

2. Second Embodiment

Figure 7:
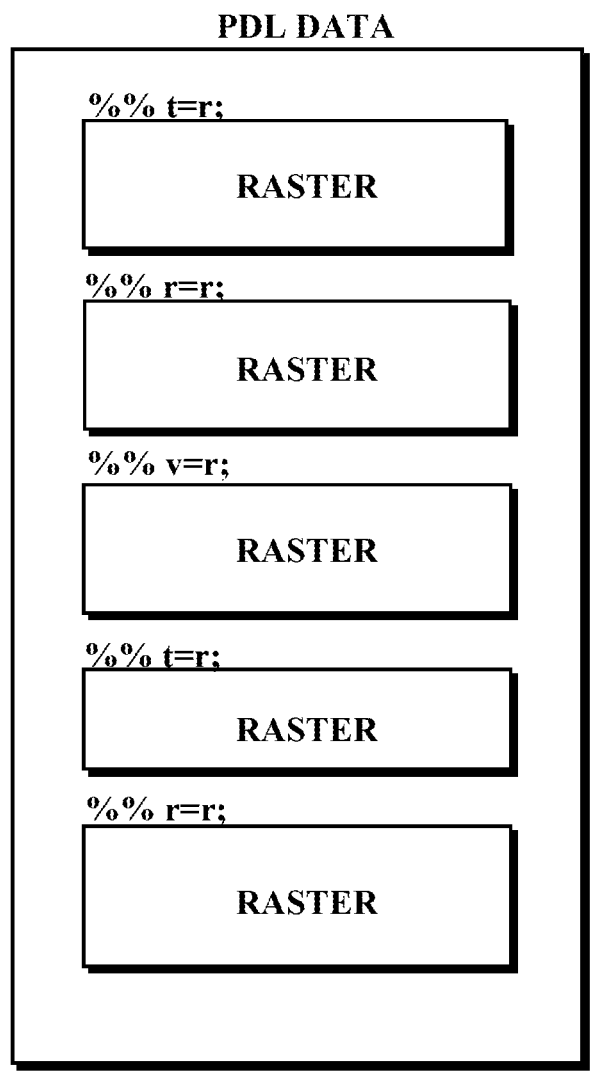
FIG. 7 is a schematic diagram illustrating a configuration of PDL data according to a second embodiment.

FIG. 7 is a schematic diagram illustrating the configuration of the PDL data according to a second embodiment. The second embodiment is different from the first embodiment in that information ("before-and-after-conversion information") indicating the data format before the conversion and the data format after the conversion is associated with the object. The letter before "=" indicates the data format before the conversion, and the letter after "=" indicates the data format after the conversion. For example, the comment "%% t=r" indicates that the text format "t" has been converted into the raster format "r"; and the comment "%% r=r" indicates that the raster format "r" has been retained without being converted into other formats; and "%% v=r" indicates that the vector format "t" has been converted into the raster format "r". It should be noted that the before-and-after-conversion information may be attached to the front or rear of the object.

Figure 8:
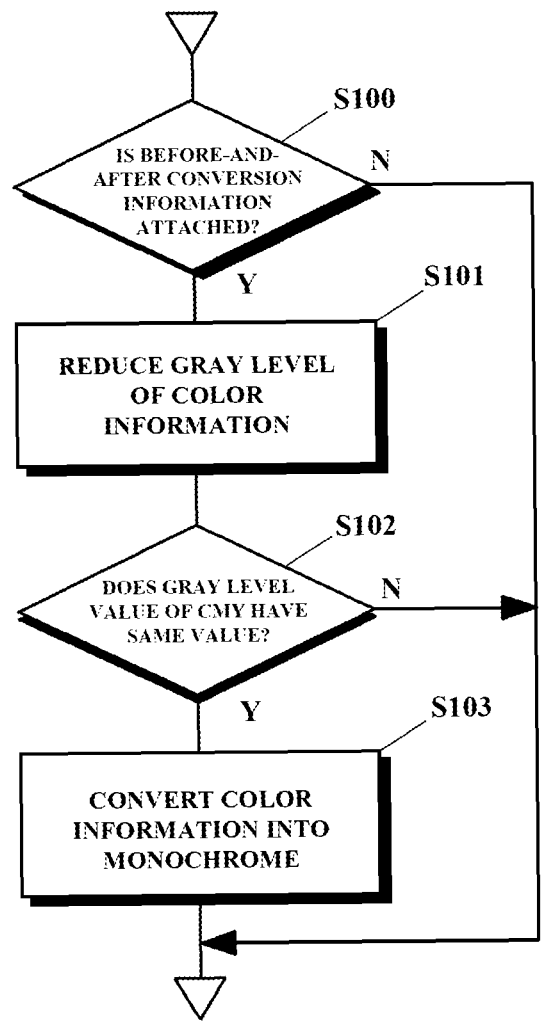
FIG. 8 is a flowchart illustrating an example of an operation in accordance with before-and-after-conversion information according to the second embodiment.

FIG. 8 is a flowchart illustrating an example of an operation in accordance with the before-and-after-conversion information.

(S100) When an interpreter converts the PDL data into the display list, if the comment "%% t=r" or the comment "%% v=r" as the before-and-after-conversion information is attached to the front of the object, the process proceeds to Step S101. If the comment "%% r=r" as the before-and-after-conversion information is attached to the front of the object, the process proceeds to the typical conversion into the display list without performing the Step S101.

(S101) As in the case of the first embodiment, the number of gray levels of the color information included in the object is reduced.

(S102) If the reduced gray level value of each of the overlaying CMY (cyan, magenta, and yellow) indicates the gray level value of black or gray (for example, if the gray level value of each of the CMY has the same value), the process proceeds to Step S103. If not, the process proceeds to the typical conversion into the display list.

(S103) The color information included in the object is converted into monochrome with the K (black). For example, if the gray level value of each of the CMY indicates V, V may be added to the gray level value of the K such that the gray level value of each of the CMY becomes 0.

According to the second embodiment, the before-and-after-conversion information is associated with all of the objects, operations in the image forming apparatus come to be unified, and control becomes easier than in the case of the first embodiment.

Further, if a raster object is being converted from a text object and if the CMY represents black or a color close to black, then the K is used for printing, which makes it possible to improve the quality and the saturation of the image.

It should be noted that the flowchart of the second embodiment illustrated in FIG. 8 may be applied to the first embodiment, and the flowcharts of the first embodiment illustrated in FIG. 6A or FIG. 6B may be applied to the second embodiment.

The present disclosure of the embodiment includes various other embodiments. For example, other designs may be used in which the above-described components are each present.

For example, in the second embodiment, if there is no change in the data format, the before-and-after-conversion information (e.g., a comment "%% r=r") needs not be attached to the object. If the before-and-after-conversion information is not attached, the operation in Step S101 or S103 may not be performed. In this case, the printer driver 40 may select whether to attach the before-after-conversion information.

Further, for example, in the setting screen of FIG. 3B or FIG. 3C, a preview of an image having been reduced in the number of gray levels of the color information or having been converted into the monochrome may be displayed.

Further, gray level reduction may be performed by approximation with pallet colors.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. A non-transitory computer-readable recording medium storing a printer driver, the printer driver causing a computer to function as:
   a page description language (PDL) conversion unit configured to convert drawing data received from an application into PDL data;
   a rasterization unit configured to convert an object into a raster object when the drawing data is converted into the PDL data, wherein the object is at least one of a text object and a vector object; and
   a communication control unit configured to transmit the PDL data to an image forming apparatus,
   wherein before-conversion information is attached as a comment to a front or a rear of the converted raster object, which indicates that a data format of the object before the conversion into a raster object is a text object or a vector object, and
   wherein the printer driver controls the image forming apparatus to reduce a number of gray levels of color information included in the object (i) if the transmitted PDL data is printed in color and (ii) if the before-conversion information is attached to the converted raster object.

2. The non-transitory computer-readable recording medium storing the printer driver according to claim 1,
   wherein at least one of the text object or the vector object is converted into the raster object in accordance with a setting value.

3. The non-transitory computer-readable recording medium storing the printer driver according to claim 2,
   wherein a print condition setting screen is displayed on a display device of the computer and the setting value is set on the print condition setting screen.

4. The non-transitory computer-readable recording medium storing the printer driver according to claim 1,
   wherein the number of gray levels of the color information is reduced by deleting one or more low order bit of a gray level value of each of cyan, magenta, yellow, and black.

5. The non-transitory computer-readable recording medium storing the printer driver according to claim 1,
   wherein if the gray level value of each of the cyan, magenta, and yellow are the same, the color information is converted into monochrome with color that has the maximum value among the gray level values of the cyan, magenta, yellow, and black.

6. The non-transitory computer-readable recording medium storing the printer driver according to claim 1,
   wherein if gray level value of each of the cyan, magenta, and yellow are the same, the color information is converted into monochrome with black.

7. A non-transitory computer-readable recording medium storing a printer driver, the printer driver causing a computer to function as:
   a PDL conversion unit configured to convert drawing data received from an application into PDL data;
   a rasterization unit configured to convert an object into a raster object when the drawing data is converted into the PDL data, wherein the object is at least one of a text object, a vector object, and a raster object; and
   a communication control unit configured to transmit the PDL data to an image forming apparatus,
   wherein before-and-after-conversion information is attached as a comment to the front or rear of the converted raster object, which indicates that a data format of the object before and after the conversion is the text object, the vector object, or the raster object, is associated with the raster object and, wherein the printer driver controls the image forming apparatus to reduce a number of gray levels of color information included in the object (i) if the transmitted PDL data is printed in color and (ii) if the before-conversion information indicates that the object is a text object or a vector object.

8. A printing method with a printer driver, the method comprising:

converting drawing data received from an application into PDL data;

converting an object into a raster object when the drawing data is converted into the PDL data, wherein the object is at least one of a text object and a vector object;

attaching before-conversion information as a comment to the front or rear of the converted raster, which indicates that a data format of the object before the conversion into the raster object is a text object or a vector object;

transmitting the PDL data to an image forming apparatus; and controlling the image forming apparatus to reduce a number of gray levels of color information included in the object (i) if the transmitted PDL data is printed in color and (ii) if the before-conversion information is attached to the converted raster object.

9. The printing method with the printer driver according to claim 8, wherein at least one of the text object or the vector object is converted into the raster object in accordance with a setting value.

10. The printing method with the printer driver according to claim 9, wherein a print condition setting screen is displayed on a display device of the computer and the setting value is set on the print condition setting screen.

11. The printing method with the printer driver according to claim 8, wherein the number of gray levels of the color information is reduced by deleting one or more low order bit of a gray level value of each of cyan, magenta, yellow, and black.

12. The printing method with the printer driver according to claim 8, wherein if gray level value of each of the cyan, magenta, and yellow are the same, the color information is converted into monochrome with color that has the maximum value among the gray level values of the cyan, magenta, yellow, and black.

13. The printing method with the printer driver according to claim 8, wherein if gray level value of each of the cyan, magenta, and yellow are the same, the color information is converted into monochrome with black.

14. The printing method with the printer driver according to claim 8, wherein the printer driver is stored in a recording medium selected from a group of recording mediums consisting of a read only memory, a universal serial bus memory, a flexible disk, a memory card, and a magneto-optical disk.

* * * * *